(12) United States Patent
Armstrong

(10) Patent No.: US 11,047,197 B2
(45) Date of Patent: Jun. 29, 2021

(54) WELLBORE TOOL AND A TOOL SECTION INTERCONNECTION FLUID COUPLING

(71) Applicant: C6 TECHNOLOGIES AS, Stavanger (NO)

(72) Inventor: Kenny Armstrong, Glasgow (GB)

(73) Assignee: C6 TECHNOLOGIES AS, Stavanger (NO)

( * ) Notice: Subject to any disclaimer, the term of this patent is extended or adjusted under 35 U.S.C. 154(b) by 0 days.

(21) Appl. No.: 16/768,277

(22) PCT Filed: Feb. 5, 2019

(86) PCT No.: PCT/NO2019/050033
§ 371 (c)(1),
(2) Date: May 29, 2020

(87) PCT Pub. No.: WO2019/151878
PCT Pub. Date: Aug. 8, 2019

(65) Prior Publication Data
US 2020/0370385 A1 Nov. 26, 2020

(30) Foreign Application Priority Data

Feb. 5, 2018 (GB) .................................. 1801795
Feb. 5, 2018 (NO) ................................ 20180183

(51) Int. Cl.
*E21B 33/038* (2006.01)
*F16L 37/32* (2006.01)
(52) U.S. Cl.
CPC ............ *E21B 33/038* (2013.01); *F16L 37/32* (2013.01)
(58) Field of Classification Search
CPC ..... E21B 33/038; E21B 33/0353; F16L 37/32
See application file for complete search history.

(56) References Cited

U.S. PATENT DOCUMENTS 6,050,544 A * 4/2000 Meronek ............. E21B 33/0355
251/149.6
6,085,785 A 7/2000 Smith, III
(Continued)

FOREIGN PATENT DOCUMENTS

WO WO 98/17937 A1 4/1998
WO WO 02/063131 A1 8/2002
(Continued)

OTHER PUBLICATIONS

International Preliminary Report on Patentability, issued in PCT/NO2019/050033, dated Jan. 17, 2020.
(Continued)

*Primary Examiner* — James G Sayre
(74) *Attorney, Agent, or Firm* — Birch, Stewart, Kolasch & Birch, LLP

(57) ABSTRACT

A wellbore tool and a tool section interconnection fluid coupling includes first and second coupling members arranged to be connected and disconnected relative each other. Both the first and second coupling members are arranged to be in a closed position preventing fluid passage through the fluid coupling, and in an open position allowing fluid passage through the fluid coupling. The first coupling member includes a first cylindrical housing, and a first valve element. The first valve element is movably arranged inside the first cylindrical housing. The cylindrical housing includes a valve seat. The valve element is arranged to push against the valve seat when the first and second coupling members are disconnected. The valve element includes a first support portion between a hollow portion and a seal groove.

18 Claims, 6 Drawing Sheets

(56) References Cited

U.S. PATENT DOCUMENTS

| | | | |
|---|---|---|---|
| 6,213,202 B1 | 4/2001 | Read, Jr. | |
| 6,237,632 B1* | 5/2001 | Smith, III | E21B 33/038 |
| | | | 137/614.19 |
| 2011/0094757 A1* | 4/2011 | Milkovisch | E21B 49/10 |
| | | | 166/387 |

FOREIGN PATENT DOCUMENTS

| | | |
|---|---|---|
| WO | WO 2016/010436 A1 | 1/2016 |
| WO | WO 2017/216296 A1 | 12/2017 |

OTHER PUBLICATIONS

International Search Report, issued in PCT/NO2019/050033, dated Apr. 26, 2019.
Norwegian Search Report, issued in Priority Application No. 20180183, dated Jul. 3, 2019.
United Kingdom Combined Search and Examination Report, issued in Priority Applicaiton No. 1801795.4, dated Jul. 9, 2018.
Written Opinion of the International Searching Authority, issued in PCT/NO2019/050033, dated Apr. 26, 2019.

* cited by examiner

Fig. 4a                    Fig. 4b

WELLBORE TOOL AND A TOOL SECTION INTERCONNECTION FLUID COUPLING

TECHNICAL FIELD

The present invention relates to fluid quick connect couplings used for interconnecting tool sections of wellbore tools where fluid, such as hydraulic fluid is allowed to flow from one tool section to another when the tool sections are connected.

BACKGROUND

Well intervention is a broad topic covering operations in oil or gas wells that are still operational, i.e. able to deliver gas or oil. Intervention operations will typically be carried out to improve the quality or extend the production life of the wellbore.

Intervention operations can be performed both in openhole and cased wellbores, where examples of such operations can be to replace equipment in the well such as pumps, valves etc., adjusting or repairing such equipment, fishing operations, monitoring well parameters, well reconfiguration etc.

When performing well intervention operations, different types of intervention tools are used for different intervention types, and modular tools have been proposed to allow reconfiguration of the tools for different operations.

In international patent publication WO2016010436, a petroleum well downhole mechanical services platform tool on a conveyor line is disclosed where the conveyor line comprises a power and signal line for communicating with a surface system, and the power and signal line is connected via a head assembly to a communications module and further connected to a master electronics module for controlling a motor drive electronics module connected to the power line for driving a hydraulic power unit, the hydraulic power unit providing hydraulic power to one or more of an anchor unit for anchoring to a wall in the petroleum well and a linear actuator module arranged for linearly actuating along the axis of the petroleum well a conveyed device such as a tool and/or an instrument.

Due to the length of fully assembled tools and the difficulty in physical handling of such tools, the tools should preferably be broken down into separate modules before transportation and shipping to the intervention location. Where hydraulic oil or other fluid is used, the modules have to be assembled and oil filled at the wellsite. This requires time and expensive equipment.

If the tool modules are filled with fluid before shipping and assembly and remain filled even after disassembly, there would be less wellsite deployment time and less need for fluid filling stations.

Some hydraulic interconnects allowing pre-filling of tool modules exist. However, improved connections are required, especially to avoid fluid-spill when disassembling the sections as part of a typical job preparation, or when replacing modules, e.g. with other module types.

PCT publications WO02063131A1 and WO 9817937A1 show hydraulic couplings with a pair of interconnectable male and female members.

US 20110094757A1 discloses an apparatus and a method to seal and prevent leakage within a downhole tool are disclosed herein. The apparatus includes a first body portion having a first fluid flow path formed therethrough and a second body portion having a second fluid flow path formed therethrough.

U.S. Pat. No. 6,213,202B1 shows a connector permitting separation of a submergible pumping system from its deployment system. The connector includes an upper assembly and a lower assembly that are connected by shear screws.

SHORT SUMMARY

A goal with the present invention is to overcome the problems of prior art, and to disclose a system and a method with an improved tool section interconnection fluid coupling to save time and costs related to the intervention operations.

The invention solving the above mentioned problems is a wellbore tool section interconnection fluid coupling and a wellbore tool according to the independent claims.

An effect of the invention is that the fluid leakage is reduced during the connection and disconnection transitional states of tool modules, and the need for refill during and between intervention operations will be reduced.

Further, the valve members of the fluid coupling are stabilized in its entire movement between the closed and open positions to ensure leak free connection and disconnection. The connection according to the invention also has the advantage that the parts making up the connection are easy to manufacture and assemble.

BRIEF DESCRIPTION OF THE DRAWINGS

FIG. 4a is a detailed perspective view of an embodiment of the interior movable parts, such as the first valve element (120) and the retaining element (130) of the first coupling member (10).

FIG. 4b is a cross section view of the movable parts in FIG. 3a.

EMBODIMENTS OF THE INVENTION

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

The embodiments described below are numbered. In addition to the numbered embodiments, dependent embodiments defined in relation to the numbered embodiments are disclosed. Unless otherwise specified, any embodiment that can be combined with one or more numbered embodiments may also be combined directly with any of the dependent embodiments of the numbered embodiment(s) referred to.

Figure 1A:
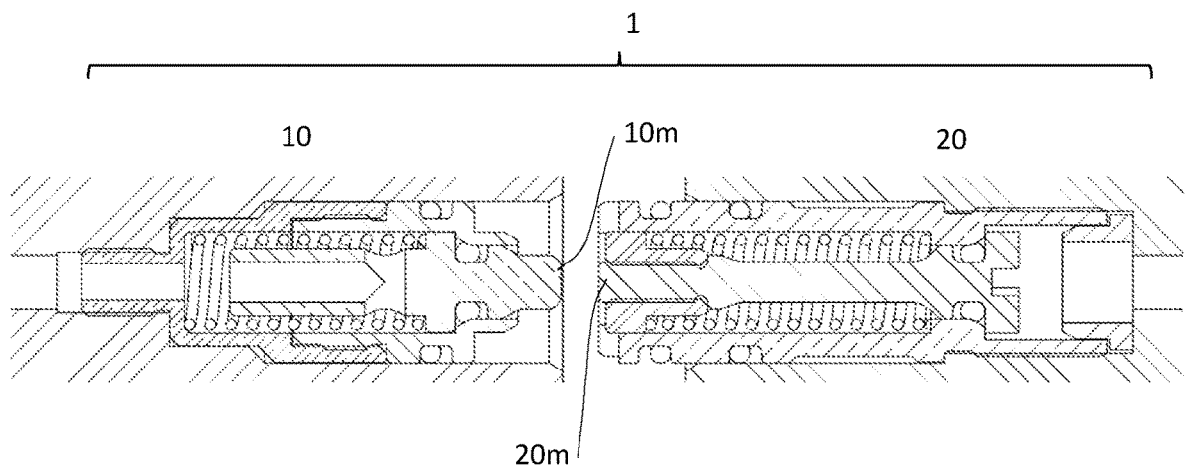
FIG. 1a illustrates in a cross section a wellbore tool section interconnection fluid coupling (1) according to an embodiment of the invention. In this figure the fluid coupling is disconnected, i.e. the first and second coupling members (10, 20) are separated.
Figure 1B:
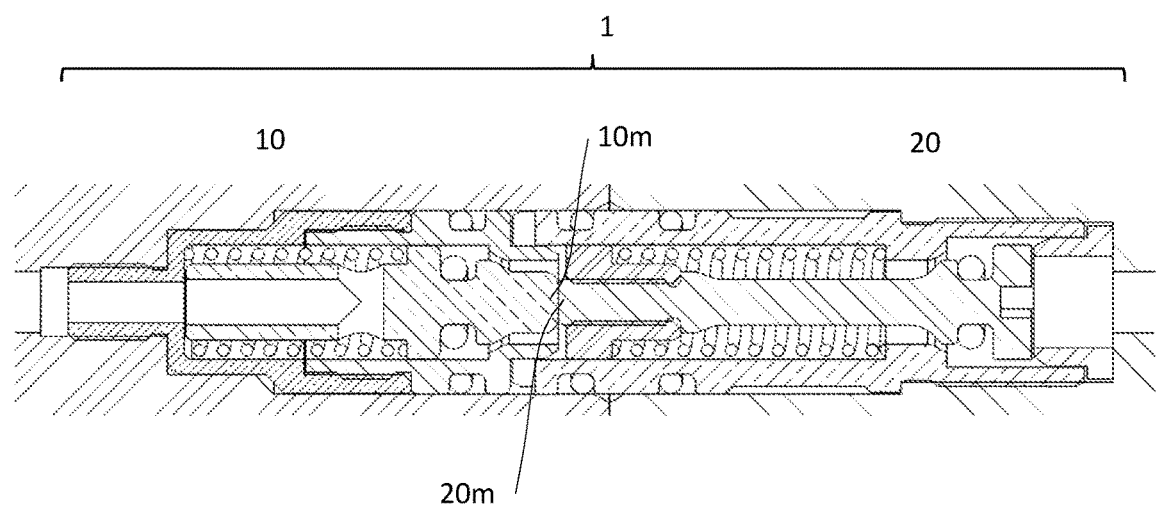
FIG. 1b illustrates the same wellbore tool section interconnection fluid coupling (1) as in FIG. 1a, but here the fluid coupling is connected, i.e., the first and second coupling members (10, 20) have been pushed towards each other to allow fluid connection through the coupling.

In a first embodiment the invention is a wellbore tool section interconnection fluid coupling (1) comprising first and second coupling members (10, 20) with first and second mating ends (10m, 20m), respectively, wherein the first and second coupling members (10, 20) are arranged to be connected and disconnected relative each other as illustrated in FIGS. 1a and 1b.

Both the first and second coupling members (10, 20) are configured to be in a closed position preventing fluid passage through the fluid coupling (1) when the first and second coupling members (10, 20) are disconnected, as illustrated in FIG. 1a, and in an open position allowing fluid passage through the fluid coupling (1) when the first and second coupling members (10, 20) are connected, as illustrated in FIG. 1 b.

Figure 2A:
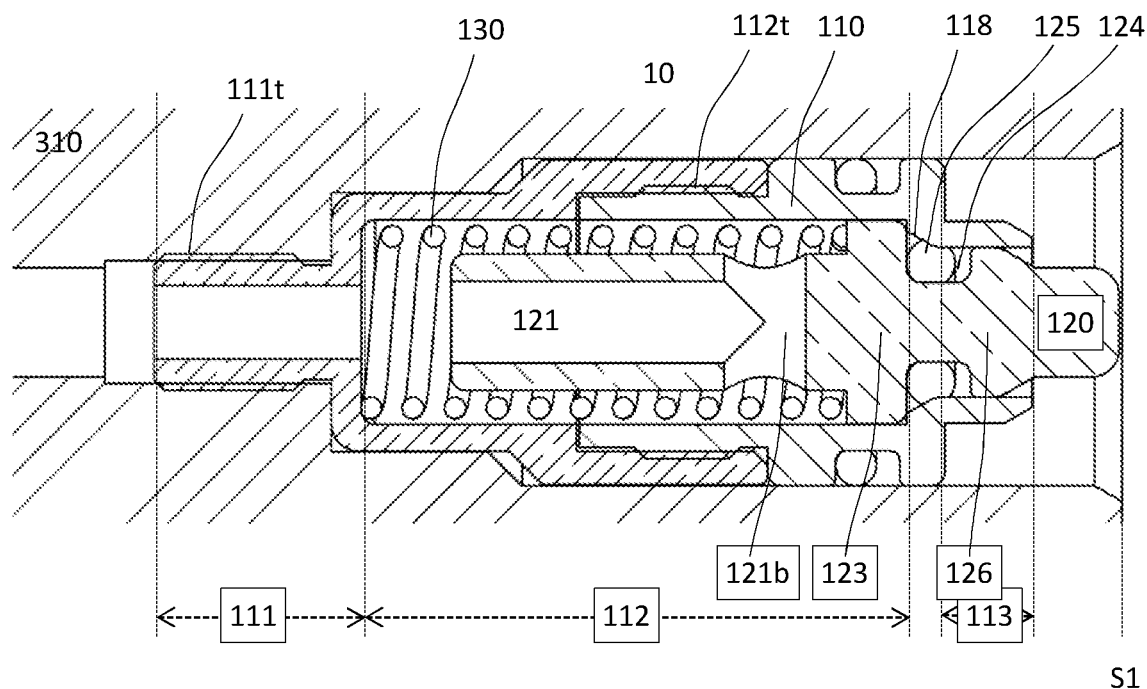
FIG. 2a illustrates in a cross section details of the first coupling member (10) of FIGS. 1a and 1b. The fluid coupling is disconnected and fluid is not allowed to pass through the first coupling member.
Figure 2B:
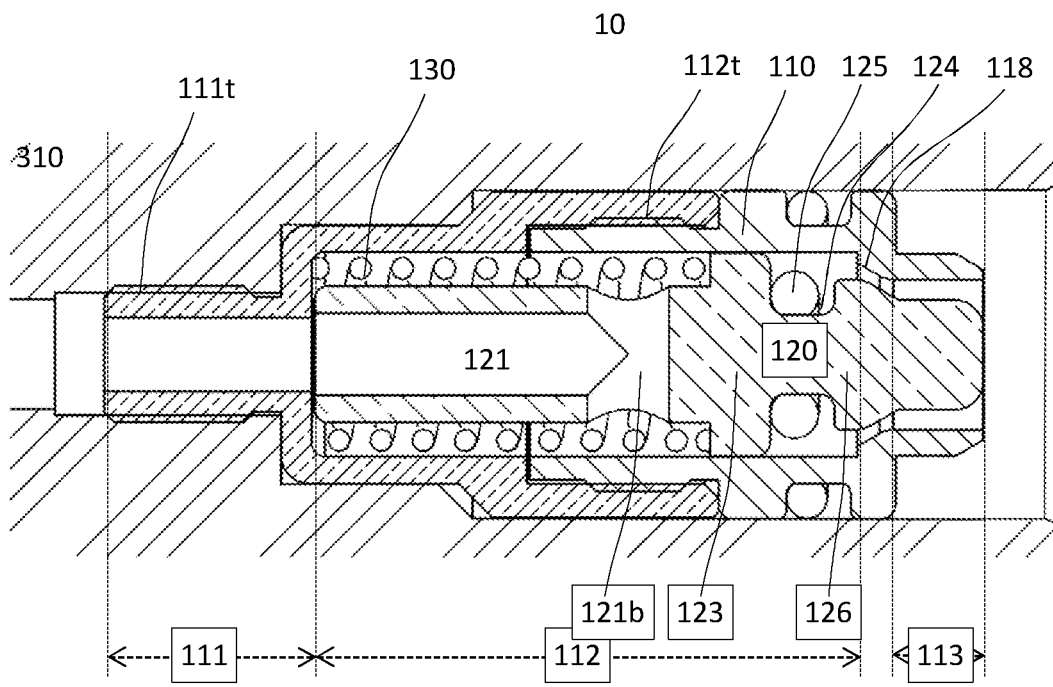
FIG. 2b illustrates in a cross section details of the first coupling member (10) of FIGS. 1a, 1b and 2a. The fluid coupling is in a connected state and fluid is allowed to pass through the first coupling member.

FIGS. 2a and 2b illustrate in more detail the first coupling member when it is in a disconnected and connected state, respectively. The first coupling member (10) comprises a first cylindrical housing (110), and a first valve element (120), wherein the first valve element (120) is movably arranged inside the first cylindrical housing (110), and the cylindrical housing (110) comprises a valve seat (118) which extends radially inwardly of the cylindrical housing (110), wherein the valve element (120) is arranged to abut against the valve seat (118) when the fluid coupling (1) is in the closed position, as illustrated in FIG. 2a. The abutment of the valve element with the valve seat closes the first coupling member (10).

In a first dependent embodiment of the first embodiment, the first cylindrical housing (110) comprises an output section (113) at the first mating end (10m), an input section (111), and a middle section (112) between the output section (113) and the input section (111), wherein the inner diameter of the middle section (112) is larger than the inner diameter of the output section (113). The sections have been illustrated in FIG. 2a with vertical dotted lines.

Due to the aforementioned restrictions, the valve element (120) is then trapped inside the cylindrical housing (110).

In a second dependent embodiment of the first embodiment that may be combined with the first dependent embodiment above, the conical seat (118) is arranged between the middle section (112) and the output section (113), where the conical section is arranged with its larger inner diameter in the direction of the middle section (112). Thus, the conical section forms a gradually reducing inner diameter from the middle section (112) to the output section (113).

The valve seat (118) may in general be of any geometrical shape that allows the valve element (120) to abut the valve seat (118) and close the first coupling member (10).

In a third dependent embodiment of the first embodiment that may be combined with any of the dependent embodiments above, the valve seat (118) is conical. Further, the valve seat may comprise e.g. frusto-conical, or convex curved shape such as circular, elliptic and/or parabolic portions. The valve element (118) may have a corresponding shape.

In a fourth dependent embodiment of the first embodiment that may be combined with any of the dependent embodiments above, the first valve element (120) comprises a seal, such as an O-ring (125) arranged to abut against the valve seat (118) when the fluid coupling (1) is in the closed position, as illustrated in FIG. 2a.

In a fifth dependent embodiment of the first embodiment that may be combined with the fourth dependent embodiment above, the first valve element (120) comprises a seal groove, such as an O-ring groove (124) wherein the O-ring (125) is arranged in the O-ring groove (124). Since the O-ring is arranged in the groove, it will follow the movement of the valve element (120), and when the valve element is pushed towards the right in FIG. 2a, the O-ring (125) will be forced against the conical seat (118). In the opposite direction the O-ring will be retracted from the seat and the fluid is allowed to pass between the seat and the O-ring.

When a seal is used between the valve element (120) and the valve seat (118) the requirement for the shapes of the two elements to match correspondingly may be less stringent, since the seal may be configured to adapt to the valve seat (118) on the side facing the valve seat (118) and to adapt to the valve element (120) on the side facing the valve element (120). Thus, instead of using an O-ring, other seals such as X-rings, Q-rings, square-cuts, lathe cuts, or Square rings could be used.

The above mentioned features reduce or eliminate seal friction during transitional states, i.e. during connection and disconnection of the wellbore tool section interconnection fluid coupling (1).

In a second embodiment that may be combined with the first embodiment above, the first valve element (120) comprises a hollow portion (121) facing towards the input section (111). The hollow portion (121) may have a cylindrical inner surface.

In a dependent embodiment of the second embodiment, the hollow portion (121) and the input section (111) have similar inner diameters, and the hollow portion (121) is arranged to abut the input section (111) when the fluid coupling (1) is in an open position.

In a third embodiment that may be combined with the second embodiment, the valve element (120) comprises a first support portion (123) between the hollow portion (121) and the O-ring groove (124), wherein the first support portion (123) has a larger outer diameter than the outer diameters of the hollow portion (121) and the O-ring groove (124).

In a first dependent embodiment of the third embodiment, the first support portion (123) is arranged to slide along an inside of the first cylindrical housing (110) in order to stabilize the valve element (120).

In a second dependent embodiment of the third embodiment that may be combined with the first dependent embodiment, the valve element (120) comprises a second support portion (126) opposite the O-ring groove (124) relative the first support portion (123), wherein the second support portion (126) has a smaller outer diameter than the first support portion (123).

The second support portion (126) may be arranged to rest against an inside of the output section (113) when the fluid coupling (1) is in the closed position, i.e. when the first and second coupling members (10, 20) are disconnected.

In this embodiment, both the first and second support portions (123, 126) will be arranged to radially support the valve element (120) relative to the cylindrical housing (110), i.e. the valve element (120) is supported radially on both sides of the O-ring (125), ensuring proper alignment of the O-ring in the seat (118) during disconnection of the fluid coupling (1), since the second support portion (126) will act as a guide for the valve element (120).

In a fourth embodiment that may be combined with any of the embodiments above, the first cylindrical housing (110) comprises a first retaining element (130) configured to provide a retaining force on the first valve element (120) towards the first mating end (10m), relative the first cylindrical housing (110).

The first retaining element (130) may be a helical spring arranged around the hollow portion (121).

As seen in FIG. 2a, the hollow portion (121) constitutes a natural prolongation of the input section in this case, and fluid pressure from the input section has a small influence on the spring arranged outside the hollow portion (121).

The first retaining element (130) may abut the first support portion (123) in one end and an inner edge of the first cylindrical housing (110) in the other end as illustrated e.g. in FIG. 2a, where the spring is forcing the valve element (120) to the right.

In a fifth embodiment that may be combined with any of the embodiments comprising the hollow portion (121), the wellbore tool section interconnection fluid coupling (1) comprises a lateral bore (121b) fluidly connecting an inside and an outside of the hollow portion (121). The lateral bore (121) may be arranged between the hollow portion (121) and the first support portion (123).

Figure 4C:
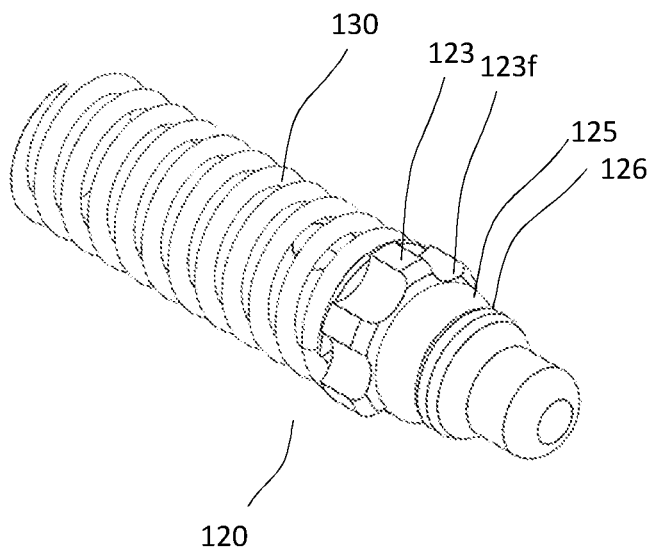
FIG. 4c is similar to FIG. 3a, without the retaining element.
Figure 4C:
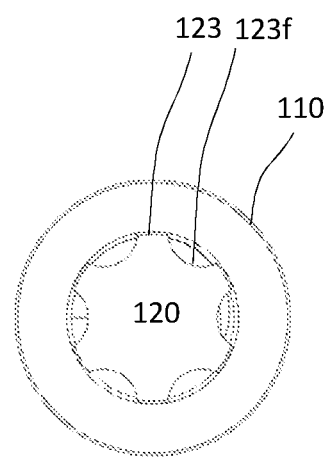
Figure 4C:
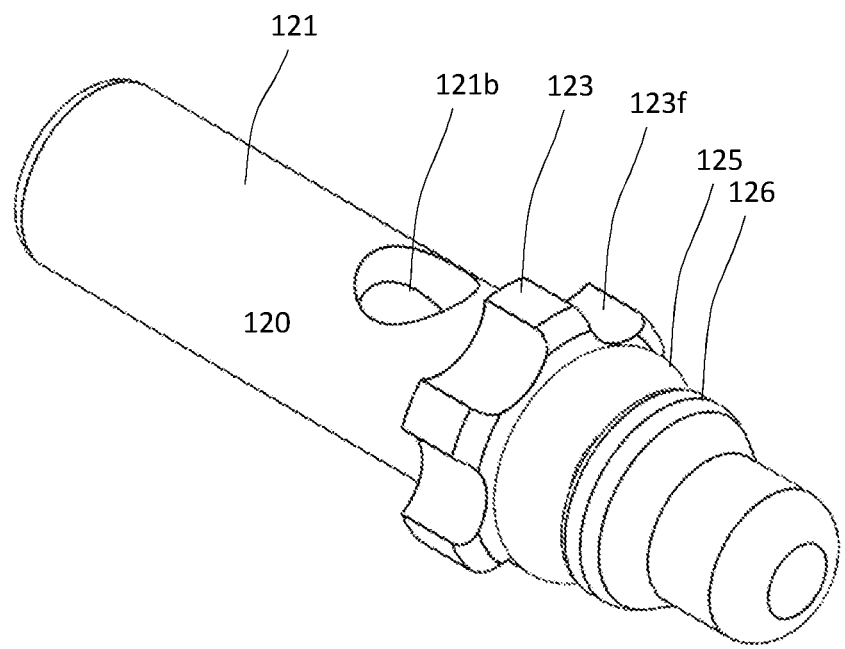

In a sixth embodiment, that may be combined with any of the embodiments above comprising the first support portion (123) and the lateral bore (121b), the first support portion (123) comprises fluid passages (123f), as seen in FIGS. 4a, 4b and 4c, fluidly connecting the outside of the hollow portion (121) with the output section (113) when the first and second coupling members (10, 20) are connected. Thus when the fluid coupling (1) is open, a fluid connection is established from the input section (111) through the hollow portion (121), the lateral bore (121b), the fluid passages (123f) and between the seat (118) and the O-ring (125) before the output section (113). The fluid will then continue into the second coupling member (20).

An embodiment of the second coupling member (20) that may be combined with any of the embodiments above, will now be described with reference to FIGS. 3a and 3b. The second coupling member (20) also has a housing (210) with a conical seat (218), a valve element (220) arranged to move in the longitudinal direction inside the housing (210), an O-ring (225) in an O-ring groove (224) of the valve element (220), first and second support portions (223, 226) along the valve element (220), and a retaining element (230) forcing the valve element (220) and the O-ring towards the seat (218) in order to prevent fluid flow when the fluid coupling is disconnected.

When the first and second coupling members (10, 20) are forced against each other, a transition between the positions of the valve elements (120, 220) of the first and second coupling members (10, 20) in FIGS. 1a and 1b will take place. The two valve elements will abut and will both be forced into their respective coupling member as illustrated in FIG. 1b. The hollow portion (12) of the valve element (120) of the first coupling member (10) will abut the inner edge of the cylindrical housing (110) resulting in a force that will push the valve element of the second coupling member to the right and the O-ring (225) in the second coupling member (20) will be released from its seat (218). The fluid coupling (1) is now in an open position and fluid may now flow through the first coupling member (10) as described previously and further into and through the second coupling member (20).

Figure 5A:
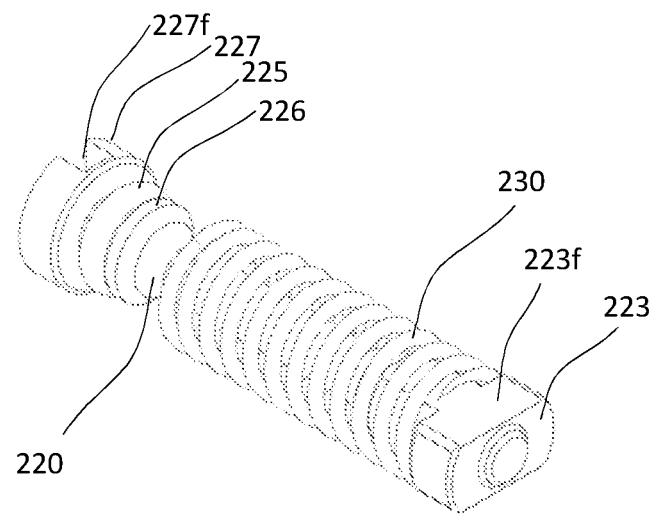
FIG. 5a is a detailed perspective view of an embodiment of the interior movable parts, such as the first valve element (120) and the retaining element (130) of the second coupling member (20).
Figure 5B:
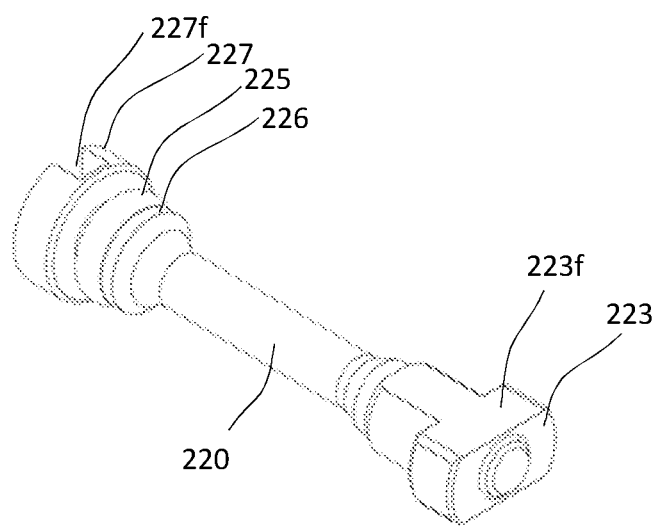
FIG. 5b is similar to FIG. 5a, without the retaining element.
Figure 6:
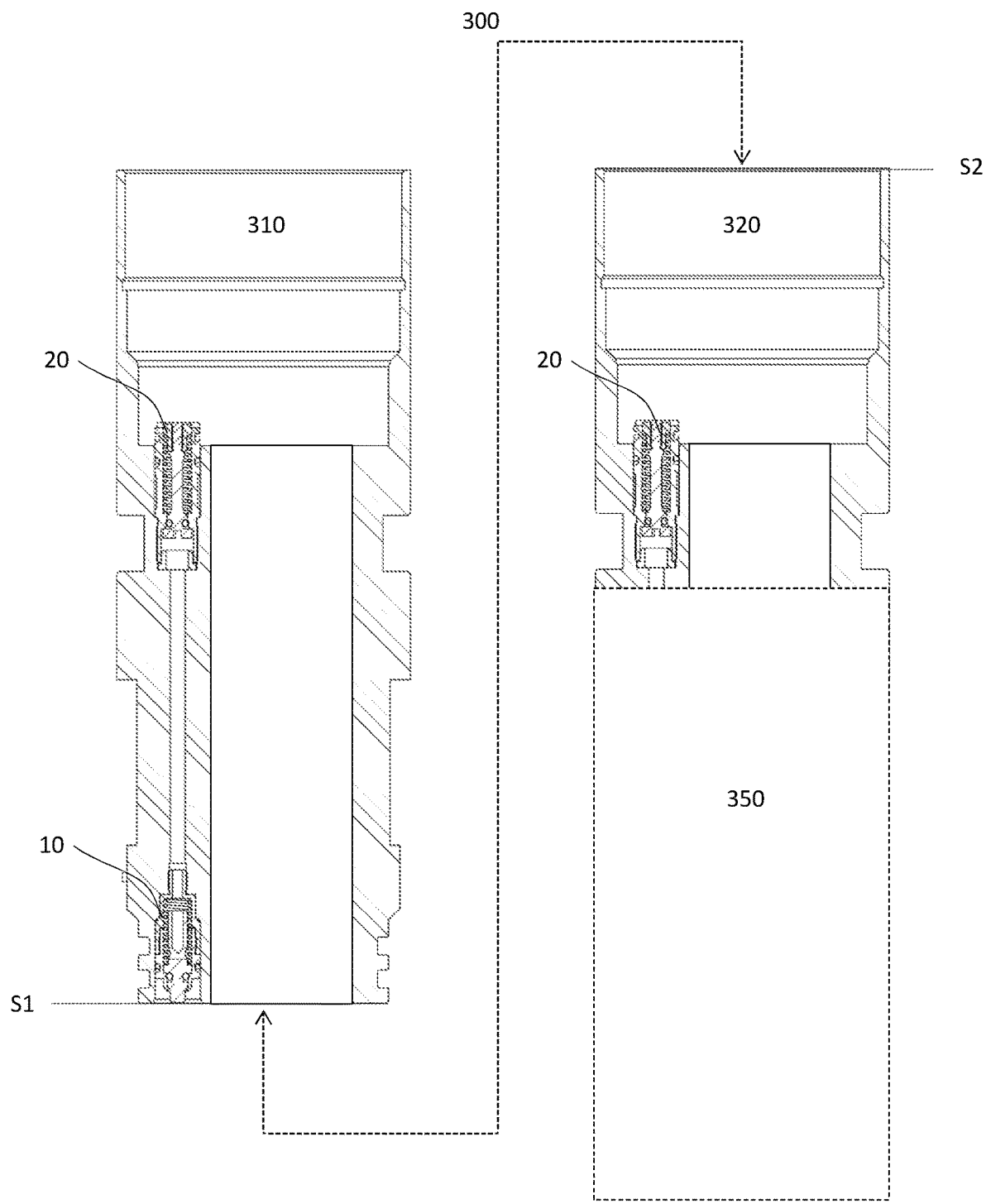
FIG. 6 illustrates in a cross section a well tool (300) comprising first and second tool sections (310, 320) configured to be connected and disconnected. The lower part of the first tool section (310) has a first coupling member (10) while the upper part of the second tool section (320) has a second coupling member (20). The second tool section (320) may have fluid feed through to a further tool section, or have a fluid consumer (350) as shown. The consumer may be a fluid motor, booster etc. that requires pressurized fluid for operation. Further the fluid consumer may be part of a well intervention tool, such as e.g. a rotational tool, actuator tool, anchor, setting tool, as well as any other fluid operated tool.

In an embodiment, that may be combined with any of the embodiments for the second coupling member (20) above, the first support portion (223) on the left side of the valve element (220) of the second coupling member (20) has fluid passages (223f) as seen in FIGS. 5a and 5b. Fluid will pass through these fluid passages, along the valve element (220) and between the O-ring (225) and the seat (218), before leaving the second fluid coupling (20) to the right.

In an embodiment that may be combined any of the embodiments for the second coupling member (20) above, the valve element (220) comprises an anti-escape portion (227) arranged behind the O-ring (225) relative to the second mating end (20m), wherein the anti-escape portion (227) is arranged in an anti-escape chamber (228), and arranged for preventing the valve element (220) from escaping the housing (210) when the coupling is disconnected.

In an embodiment that may be combined with the embodiment above, the anti-escape portion (227) comprises a fluid passage (227f) arranged to allow fluid passage across said anti-escape portion (227) when the coupling is in the connected state.

In a seventh embodiment, the invention is a wellbore tool (300) comprising first and second tool sections (310, 320) configured to be connected and disconnected, wherein the first tool section (310) comprises a first coupling member (10) and the second tool section (310) comprises a second coupling member (20) as defined in any of the respective embodiments above.

In a first dependent embodiment the first tool section (310) is arranged to be pre-filled with fluid before connected to the second tool section (320). The tool section (310) may be prefilled by connecting a fluid reservoir via a fluid pump to the first coupling member (10).

The first tool section (310) may comprise a fluid tube or bore connected to the input section (111). The tube or bore may be machined into the first tool section (310) as indicated above.

The first tool section (310) may comprise a second coupling member (20) in the opposite end of the first tool section (310) relative the first coupling member (10).

When the tool section itself does not make use of the fluid, or fluid distribution is required for the toll section below, the first tool section (310) may comprise a fluid feed through connection between the first and second coupling members (10, 20) as illustrated in FIG. 5.

The first and second tool sections (310, 320) may have respective first and second tool section interfaces (S1, S2) arranged to face each other when the first and second tool sections (310, 320) are connected, wherein an output portion of the valve element (120) is arranged inside or in line with the first tool section interface (S1) to protect the valve element (120).

In an eighth embodiment that may be combined with the seventh embodiment above, a housing of the second coupling member (20) of the second tool section (320) extends into the first tool section interface (S1) when the first and second tool sections (310, 320) are connected.

The housing of the second coupling member (20) may comprise an outward facing O-ring arranged to seal against an inner surface of the first coupling member (10), surrounding the valve members (120) mating end (10m).

As can be seen from the embodiments illustrated in FIGS. 2a, 2b, 3a, and 3b, the components comprised in the coupling members may be machined separately and then inserted into the tool sections.

The housing (110) may e.g. be produced in two separate parts and screwed together as indicated by the overlapping threaded sections (112t) in FIG. 2a. Before the two parts are joined and fastened, the valve element (120), the O-ring (125) and the retaining element (130), as illustrated in FIG. 3a, are assembled and introduced into the housing.

The housing (110) fits into a bore in a tool section (310), and is in this example fastened by an outer threaded part (111t) of the input section being fastened to a corresponding inner threaded part of the tool section (310).

Figure 3A:
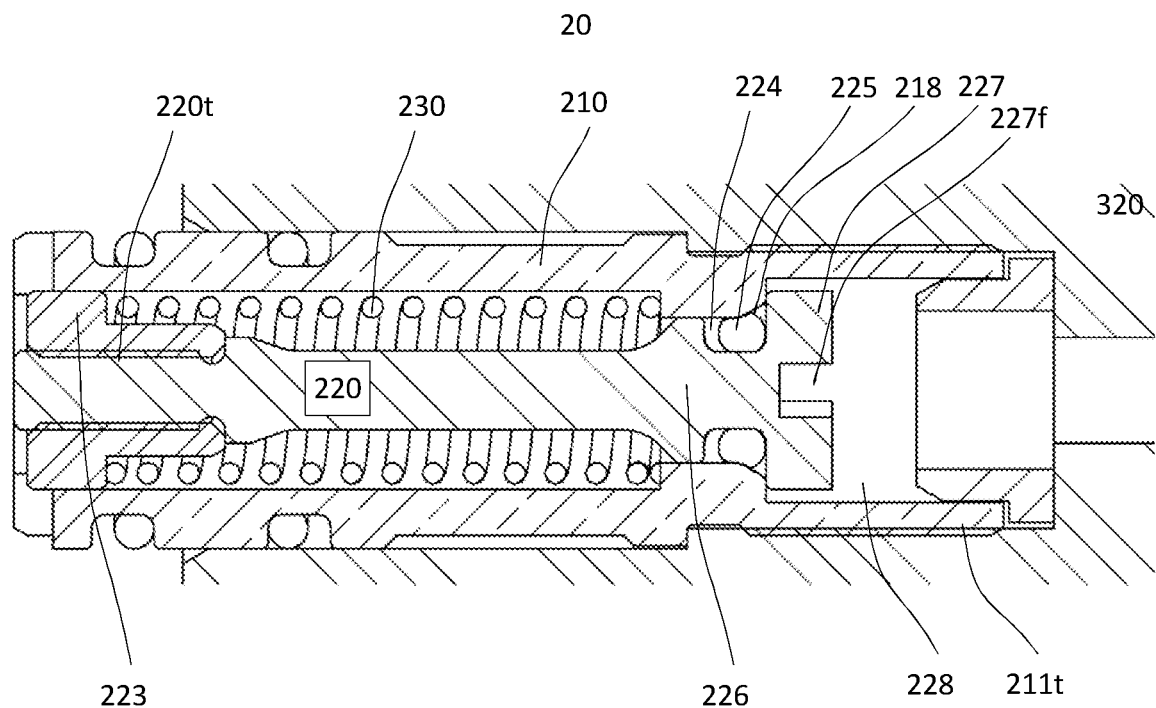
FIG. 3a illustrates in a cross section details of the second coupling member (20) of FIGS. 1a and 1b. The fluid coupling is disconnected and fluid is not allowed to pass through the second coupling member.
Figure 3B:
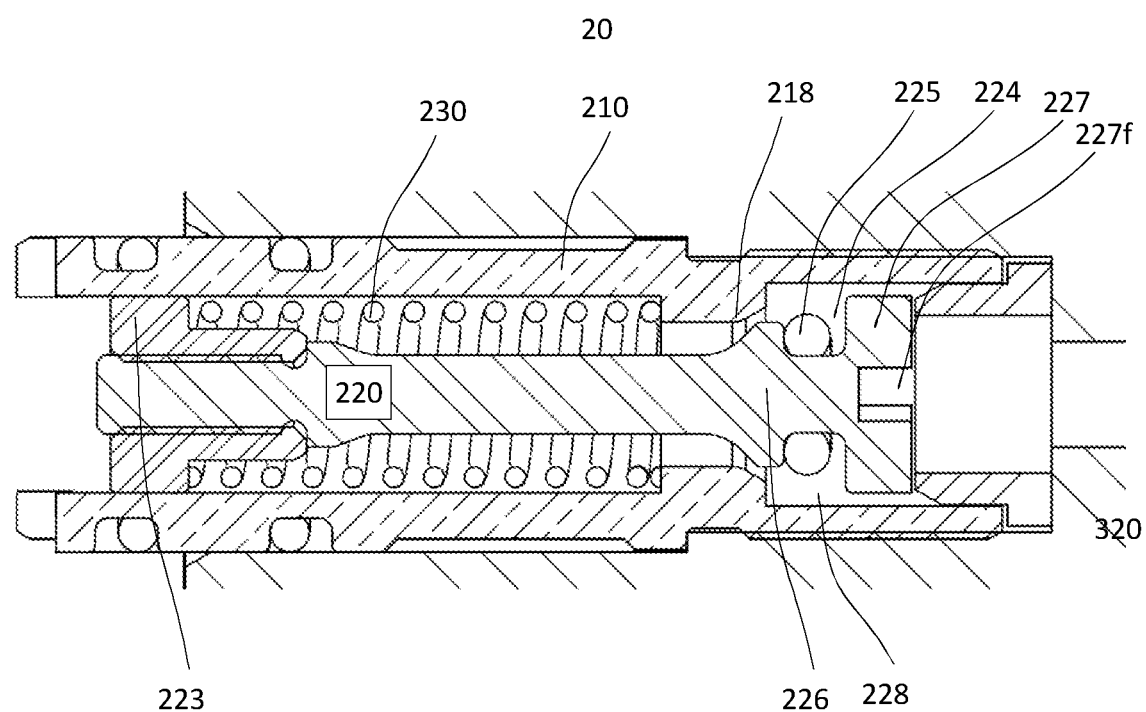
FIG. 3b illustrates in a cross section details of the second coupling member (20) of FIGS. 1a, 1b and 2a. The fluid coupling is in a connected state and fluid is allowed to pass through the second coupling member.

Similarly, the valve element (220) of the second coupling member (20) may e.g. be produced in two separate parts and screwed together as indicated by the overlapping threaded sections (220t) in FIG. 3a. Before the two parts are joined and fastened, the valve element (220), the O-ring (125) and the retaining element (130), as illustrated in FIG. 3a, are assembled and introduced into the housing.

The housing (210) fits into a bore in the second tool section (320), and is in this example fastened by an outer threaded part (211t) of the input section being fastened to a corresponding inner threaded part of the second tool section (320).

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. A wellbore tool section interconnection fluid coupling comprising:
    first and second coupling members with first and second mating ends, respectively, wherein the first and second coupling members are configured to be connected and disconnected relative to each other, and wherein fluid is allowed to flow through the coupling members when connected,
    wherein the first coupling member comprises:
        an output section at the first mating end, an input section, and a middle section between the input and output sections; and
        a first cylindrical housing and a first valve element which is movably arranged inside said first cylindrical housing,
        wherein the first cylindrical housing comprises a valve seat which extends radially, inwardly of the cylindrical housing,
        wherein the valve element is arranged to abut against the valve seat when the coupling members are disconnected, and further comprises:
            a hollow portion facing towards the input section; and
            a first support portion between the hollow portion and a seal groove,
            wherein the first support portion includes:
                a lateral bore arranged between the hollow portion and the first support portion and fluidly connecting an inside and an outside of said hollow portion; and
                fluid passages fluidly connecting the outside of the hollow portion with the output section when the first and second coupling members are connected.

2. The wellbore tool section interconnection fluid coupling of claim 1, wherein the first support portion has a larger outer diameter than the outer diameters of the hollow portion and the seal groove, and is arranged to slide along an inside of the first cylindrical housing in order to stabilize the first valve element.

3. The wellbore tool section interconnection fluid coupling of claim 2,
    wherein the first cylindrical housing comprises a first retaining element configured to provide a retaining force on the first valve element towards the first mating end, relative the first cylindrical housing, and
    wherein the second coupling member has a second housing with a conical seat, a second valve element arranged to move in the longitudinal direction inside the second housing, an O-ring in an O-ring groove of the second valve element, first and second support portions along the second valve element, and a second retaining element forcing the second valve element and the O-ring towards the seat in order to prevent fluid flow when the fluid coupling is disconnected.

4. The wellbore tool section interconnection fluid coupling of claim 2, wherein the first cylindrical housing comprises an output section at the first mating end, an input section, and a middle section between the output section and the input section, wherein the inner diameter of the middle section is larger than the inner diameter of the output section.

5. The wellbore tool section interconnection fluid coupling of claim 1,
    wherein the first cylindrical housing comprises a first retaining element configured to provide a retaining force on the first valve element towards the first mating end, relative to the first cylindrical housing, and
    wherein the second coupling member has a second housing with a conical seat, a second valve element arranged to move in the longitudinal direction inside the second housing, an O-ring in an O-ring groove of the second valve element, first and second support portions along the second valve element, and a second retaining element forcing the second valve element and the O-ring towards the seat in order to prevent fluid flow when the fluid coupling is disconnected.

6. The wellbore tool section interconnection fluid coupling of claim 1, wherein the first cylindrical housing comprises an output section at the first mating end, an input section, and a middle section between the output section and the input section, wherein the inner diameter of the middle section is larger than the inner diameter of the output section.

7. The wellbore tool section interconnection fluid coupling of claim 6, wherein the valve seat is arranged between the middle section and the output section.

8. The wellbore tool section interconnection fluid coupling of claim 1, wherein the first valve element comprises a seal arranged to abut against the valve seat when the fluid coupling is in the closed position.

9. The wellbore tool section interconnection fluid coupling of claim 1, wherein the valve seat is conical.

10. The wellbore tool section interconnection fluid coupling of claim 1, wherein the hollow portion and the input section have similar inner diameters, and wherein the hollow portion is arranged to abut the input section when the first and second coupling members are connected.

11. The wellbore tool section interconnection fluid coupling of claim 1, wherein the valve element comprises a second support portion opposite the seal groove relative to the first support portion, wherein the second support portion has a smaller outer diameter than the first support portion.

12. The wellbore tool section interconnection fluid coupling of claim 11, wherein the second support portion is configured to rest against an inside of the output section when the first and second coupling members are disconnected.

13. The wellbore tool section interconnection fluid coupling of claim 1, wherein the first cylindrical housing comprises a first retaining element configured to provide a retaining force on the first valve element towards the first mating end, relative to the first cylindrical housing.

14. A wellbore tool comprising first and second tool sections configured to be connected and disconnected, wherein said first tool section comprises a first coupling member as defined in claim 1.

15. The wellbore tool according to claim 14, wherein the first tool section is configured to be pre-filled with fluid before connected to the second tool section.

16. The wellbore tool according to claim 14, wherein the first and second tool sections have respective first and second tool section interfaces arranged to face each other when the first and second tool sections are connected, wherein an output portion of the valve element is arranged inside or in line with the first tool section interface.

17. The wellbore tool according to claim 16, wherein a housing of a second coupling member of the second tool section extends into the first tool section interface when the first and second tool sections are connected.

18. The wellbore tool according to claim 17, wherein the housing of the second coupling member comprises an outward facing seal arranged to seal against an inner surface of the first coupling member.

* * * * *